US 6,628,935 B1

(12) United States Patent
Lawrence

(10) Patent No.: US 6,628,935 B1
(45) Date of Patent: Sep. 30, 2003

(54) MEMORY EXCEED NOTIFICATION FOR WIRELESS NETWORK COMMUNICATION DEVICE

(75) Inventor: Christopher Gregory Lawrence, Kirkland, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/519,993

(22) Filed: Mar. 7, 2000

Related U.S. Application Data

(63) Continuation of application No. 08/672,768, filed on Jun. 28, 1996, now abandoned.

(51) Int. Cl.[7] .............................................. H04M 11/10
(52) U.S. Cl. ..................... 455/412; 455/567; 455/414; 379/88.12
(58) Field of Search ................................. 455/412, 413, 455/414, 514, 466, 566, 156.1, 157.2; 379/88.04, 89, 67, 68, 88.12; 340/825.44

(56) References Cited

U.S. PATENT DOCUMENTS

| 5,423,086 A | | 6/1995 | Cannon et al. | |
|---|---|---|---|---|
| 5,463,382 A | | 10/1995 | Nikas et al. | |
| 5,517,491 A | * | 5/1996 | Nanni et al. | 370/100.1 |
| 5,600,703 A | | 2/1997 | Dang et al. | |
| 5,644,627 A | * | 7/1997 | Segal et al. | 455/31.2 |
| 5,687,216 A | * | 11/1997 | Svensson | 455/412.2 |
| 5,692,032 A | * | 11/1997 | Seppanen et al. | 340/825.44 |
| 5,802,466 A | * | 9/1998 | Gallant et al. | 455/413 |
| 5,933,478 A | * | 8/1999 | Ozaki et al. | 379/93.24 |
| 5,940,767 A | * | 8/1999 | Bourgeois et al. | 455/412 |
| 6,047,184 A | * | 4/2000 | Haces et al. | 455/445 |
| 6,134,433 A | * | 10/2000 | Joong et al. | 455/417 |
| 6,151,507 A | * | 11/2000 | Laibo et al. | 455/466 |

FOREIGN PATENT DOCUMENTS

| EP | 0 341 609 A | 11/1989 |
|---|---|---|
| EP | 0 639 821 A | 2/1995 |
| JP | 4-133551 | 5/1992 |

OTHER PUBLICATIONS

Motorola XP002047326, "Micro T.A.C. International 7000 Series Gebruikershandleiding", 1994, p. 64, line 1 through p. 65, line 34. (translation included).
XP000674930, Hientz, M. et al., "The Short Message Service A New Digital Mobile Communication Service", No. 124, 1994, pp. 517–526. (translation included).

* cited by examiner

Primary Examiner—Nay Maung
Assistant Examiner—Tilahun Gesesse
(74) Attorney, Agent, or Firm—Klarquist Sparkman, LLP

(57) ABSTRACT

A wireless communication device comprises a memory exceed indicator. The wireless communication device receives a message from a network. Upon receipt of the message, the device determines whether there is sufficient memory to store the message. If there is insufficient memory, the device activates a memory exceed indicator which indicates that a message is being stored in the network and that the memory of the wireless communication device contains insufficient memory to receive and store that message. If one or more messages are deleted from the memory of the device in order to make room for new messages, then a new message received from the network is stored in the memory of the device and the memory exceed indicator is deactivated.

25 Claims, 2 Drawing Sheets

MEMORY EXCEED NOTIFICATION FOR WIRELESS NETWORK COMMUNICATION DEVICE

This is a continuation of application Ser. No. 08/672,768, filed Jun. 28, 1996, now abandoned.

FIELD OF THE INVENTION

The present invention relates in general to network communication devices. In particular, the present invention relates to a memory exceed notice for a network communication device.

BACKGROUND OF THE INVENTION

Wireless communication devices exist which are capable of receiving messages from a network and storing the received messages in a memory of the device. For example, a paging receiver receives a paging message from a paging terminal and the message may be stored in a memory of the paging receiver. Similarly, a wireless mobile telephone which operates in accordance with *TIA/EIA Interim Standard IS*-136.1, *800 MHz TDMA Cellular—Radio Interface—Mobile Station—Base Station Compatibility Digital—Control Channel*, December 1994, Telecommunications Industry Association, (hereinafter referred to as "IS-136"), which is incorporated herein by reference, is capable of receiving short message service ("SMS") messages through the wireless telephone network. An SMS message is a textual message of a maximum of 256 characters. Upon receipt of the SMS message, the mobile telephone may store the message in a memory of the mobile telephone.

After a message is stored in a memory of a wireless communication device, a user of the device may display the messages on a display screen of the device. After reading the message, the user may delete the message, thereby making room in memory for additional messages, or the user may desire to leave the message stored in memory for further recall. Since the memory unit of a wireless communication device is of finite size, at some point the memory will fill with messages such that there is insufficient capacity to store additional messages. Such undeliverable additional messages will remain stored in the network. The undeliverable messages may be sent to the wireless communication device periodically until there is sufficient capacity to store the additional messages in the memory of the wireless communication device.

If there are no additional messages in the network waiting to be delivered, then there is no disadvantage to leaving all messages stored in the memory of the wireless communication device, even if the memory is full to capacity. In fact, leaving the messages stored in memory may be desirable such that the user can recall the messages at a later time. However, if there are messages waiting in the network waiting to be delivered, then such messages cannot be delivered until one or more stored messages are deleted from the wireless communication device memory in order to make room for new messages.

While it is known to provide a memory full indication for a device, such a memory full indicator only indicates that a memory is full and that no further information may be stored in the memory. However, in the messaging context, such a memory full indicator presents the user of a messaging device with incomplete information. The user will know that the memory is full but the user will not know if there are additional messages waiting to be delivered. Thus, even if the user is aware that the memory is full, the user may still want to keep all messages stored in memory for later retrieval. If there are no messages waiting to be sent in the network, then this does not present a problem. However, if there are additional messages waiting to be sent, the user may want to delete older messages to make room for newer messages. Thus, merely providing a memory full indicator presents the user of a messaging device with incomplete information.

SUMMARY OF THE INVENTION

The present invention provides a wireless communication device comprising a memory exceed indicator, and a method for operation of such a device, for indicating that a message is being stored in a network and that a memory unit of the wireless communication device contains insufficient memory to receive and store that message.

The wireless communication device receives a message from a network and determines whether it has sufficient memory to store the message. If there is insufficient memory to store the message, the wireless communication device activates a memory exceed indicator indicating that a message is waiting in the network but that the message cannot be received and stored by the device due to insufficient memory. A user may then delete some messages which are stored in the device's memory thus making room for the additional message. If the message is later resent to the device, the device will determine that there is sufficient memory to store the message. The message will be stored in memory and the memory exceed indicator will be deactivated. In alternate embodiments, the memory exceed indicator may be deactivated when messages are deleted from the memory or upon power-up of the wireless communication device.

Thus, the present invention provides an improved wireless communication device and method for operation. As described above, if the memory of a wireless communication device is full, it may be desirable to leave all messages stored in the memory so that a user of the device may retrieve the stored messages. If there are no undeliverable messages in the network waiting to be sent to the device, then there is no disadvantage to having a full memory. However, if there are messages waiting in the network, it is desirable to delete one or more messages from the memory of the device in order to make room for the new messages. By providing a user with an indication that there are undeliverable messages waiting in the network, the memory exceed indicator in accordance with the present invention provides the information necessary to allow the user to more appropriately manage the memory of the device.

These and other advantages of the invention will be apparent to those of ordinary skill in the art by reference to the following detailed description and the accompanying drawings.

DETAILED DESCRIPTION

Figure 1:
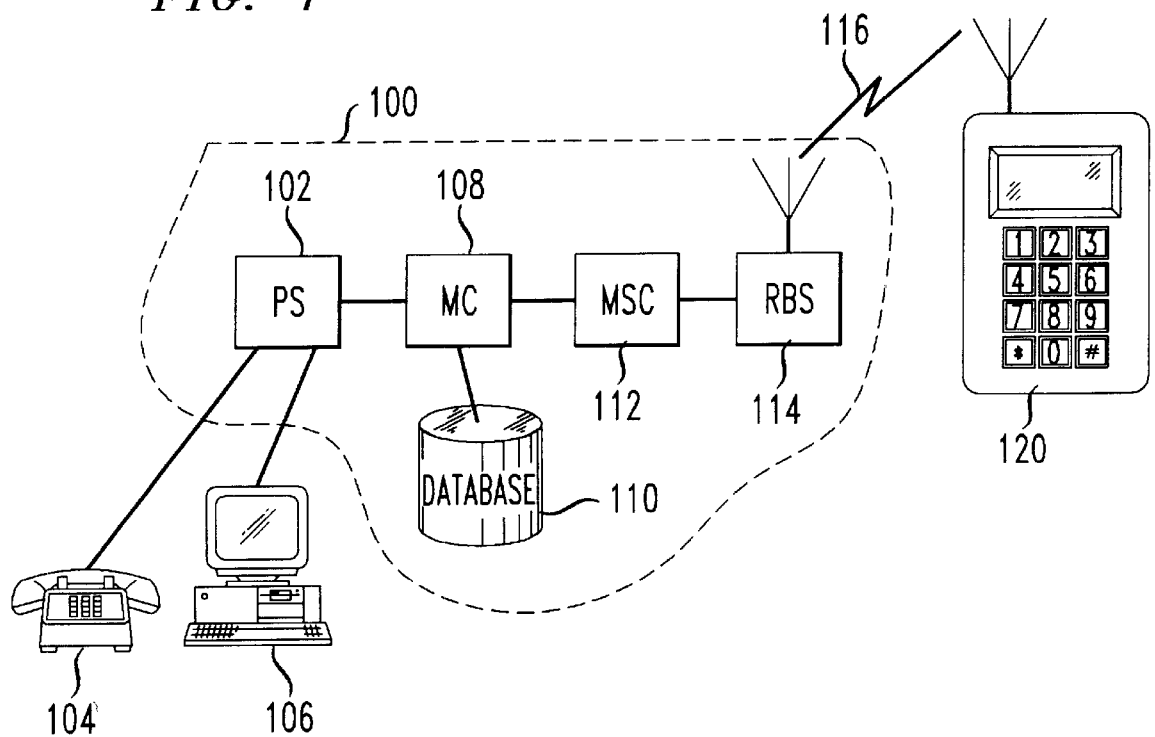
FIG. 1 shows a block diagram of a relevant portion of a wireless communication network.

FIG. 1 shows a block diagram of a relevant portion of a wireless communication network 100 which may be used to send messages to a mobile station 120. As shown in FIG. 1, the wireless communication network 100 is a wireless cellular telephone network and the mobile station 120 is a wireless mobile telephone. However, the principles of the present invention may be applied to other types of communication networks and other types of communication devices. A message originates at a paging system 102. Paging system 102 may be, for example, an attended facility in which a person makes a call from a telephone 104 and is connected to an attendant at the paging system 102. The attendant enters the requested message into the paging system at a keyboard. Alternatively, a person may connect to the paging system 102 via a data terminal 106 and enter the message directly into the paging system 102 without the need for an attendant.

The paging system is connected to a message center 108. The message center 108 receives, and stores, messages from the paging system 102. The message center 108 is connected to a database 110 which stores routing information including the location of mobile stations registered with the wireless communication network.

As is well known, wireless cellular communication networks contain a plurality of radio base stations (RBS), each of which communicates with mobile stations within the geographic serving area (cell) of the radio base station. The cell within which a mobile station is operating is called the serving cell, and the radio base station within the serving cell is called the serving radio base station. Each radio base station is connected to, and controlled by, a mobile switching center (MSC). The MSC which is connected to the serving RBS is the serving MSC. Depending on the architecture, a wireless cellular communication network may have more than one MSC, with each MSC controlling a plurality of RBSs.

For ease of illustration, FIG. 1 shows one MSC 112 connected to one RBS 114. As shown in FIG. 1, a mobile station 120 is communicating with serving RBS 114 via a wireless communication channel 116. The protocol of the wireless communication channel 116 may be, for example, the air interface described by IS-136.

Figure 2:
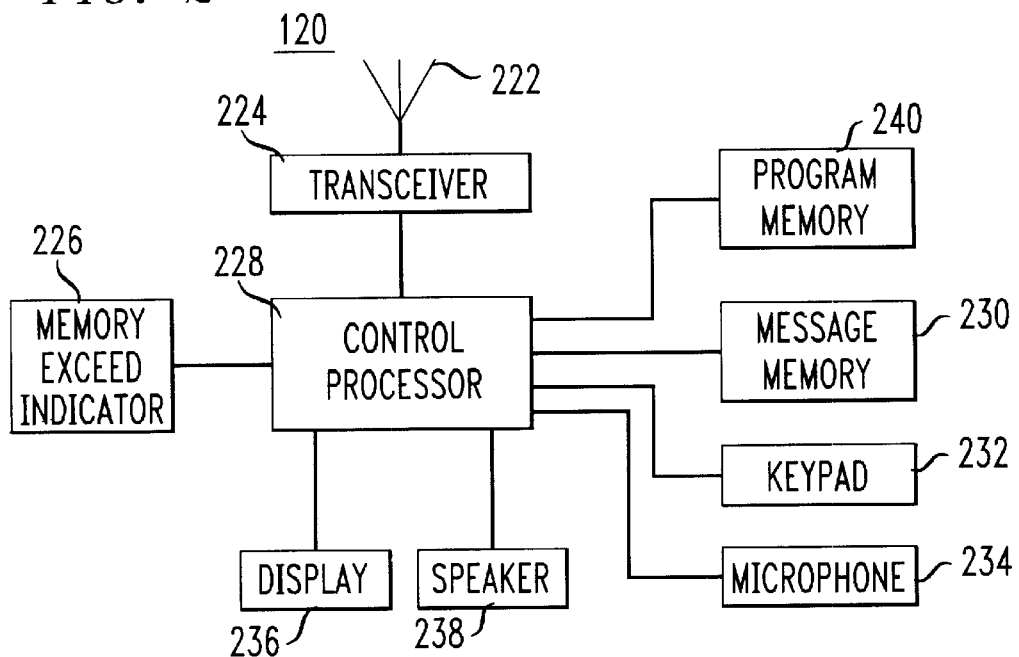
FIG. 2 is a block diagram of a mobile station.

The mobile station 120 is shown in further detail in FIG. 2. The mobile station 120 includes a transceiver 224 which sends and receives signals from antenna 222. The functioning of the mobile station 120 is controlled by a control processor 228. The control processor 228 operates by executing computer program instructions which are stored in program memory 240. Mobile station 120 also includes message memory 230 which is used to store messages which are received from the wireless communication network 100. FIG. 2 shows program memory 240 logically separate from message memory 230. It would be recognized by one skilled in the art that program memory 240 and message memory 230 could be separate memory units, or they could be one memory unit which is logically partitioned into separate storage areas. Mobile station 120 may also contain other memory (not shown) for the storage of other data which is necessary for the operation of the mobile station 120, such as user preferences, user telephone number, communication provider identification, and mobile station identification. The storage of such other information is well known in the art of mobile communications and will not be described further herein.

Mobile station 120 also includes a keypad 232 to allow a user to communicate with control processor 228. Sound information to be transmitted by the mobile station 120 is received via microphone 234 and sound information received by the mobile station 120 is played to the user via speaker 238. The mobile station 120 also includes a display 236 to allow the control processor 228 to display alphanumeric data to the user. Such alphanumeric data may include alphanumeric messages which are received from the wireless communication network 100.

In accordance with the present invention, the mobile station 120 also includes a memory exceed indicator 226 connected to the control processor 228 for indicating that a message is waiting in the wireless communication network 100 but cannot be delivered because the message memory 230 is full. The memory exceed indicator 226 may be a separate indicator, or may be incorporated into one of the other output devices, such as the display 236 or speaker 238. If the memory exceed indicator 226 is a separate indicator (as shown in FIG. 2), it may be, for example, a visual indicator such as a lamp or LED, or a tactile indicator such as a vibration unit. Alternatively, the memory exceed indicator 226 may be incorporated into the display 236 such that some type of memory exceed indication (e.g. a special icon) is displayed on the display 236. Alternatively, the memory exceed indicator 226 may be incorporated into the speaker 238 to provide for an audible indication, such as a special tone.

Message transmission will now be described with reference to FIG. 1. A message is initiated by a message sender contacting the paging system 102 via a telephone 104 or a data terminal 106. The paging system formats the message into a format appropriate for transmission to the message center 108 and transmits the message to the message center 108. The message, as sent to the message center 108, will include both the message and an indication of the intended recipient of the message. For purposes of the present example, assume that the intended recipient is the mobile station 120 which is registered with the wireless communication system 100 and is operating in the cell serviced by RBS 114 and MSC 112. The message center 108 performs a database lookup to database 110 to retrieve information identifying the location of the mobile station 120. The location information indicates that the mobile station 120 is operating in a region serviced by MSC 112 and as a result the MC 108 sends the message to MSC 112. The MSC 112 knows that the mobile station 120 is currently communicating with RBS 114 and the MSC 112 sends the message to the mobile station 120 via RBS 114 over air interface 116.

Upon receipt of the message, the mobile station 120 will store the message in message memory 230. In order to retrieve the message, a user of mobile station 120 will issue a command to-the control processor 228, via the keypad 232. If the message is an alphanumeric message, the message stored in message memory 230 may be displayed on the display 236. It is noted that the message may also be a voice message, in which case the message stored in message memory 230 will be played via the speaker 238.

In such a manner, multiple messages may be stored in the message memory 230 and the user may choose which message to retrieve. In addition, the user of mobile station 120 may issue a command to the control processor 228, via the keypad 232, to delete one or more messages from message memory 230. It may be desirable for the user to leave messages stored in message memory 230 so that the messages may be retrieved at a future time. However, the message memory 230 is finite, and eventually the memory capacity will be reached such that no further messages may be stored in the message memory 230.

If no additional messages are sent to the mobile station 120 from the wireless communication network 100 when the message memory 230 is full, then there is no disadvantage to leaving messages stored in the message memory 230, and in fact, there may be the advantage of future retrieval. However, if additional messages are waiting to be sent by the wireless communication network 100, then the user of mobile station 120 would want to delete one or more old messages from message memory 230 to make room for new additional messages. Thus, in accordance with the present invention, a memory exceed indicator 226 is provided in the mobile station 120 which will activate when a message is waiting to be sent to the mobile station 120 but cannot be successfully received by the mobile station 120 due to insufficient message memory 230.

It is noted that the mechanism for transmitting a message from a wireless communication network 100 to a mobile station 120 is well known in the art of wireless messaging. For example, if the mobile station 120 was a paging receiver and the wireless communication network 100 was a paging network, then the message would be sent in accordance with well known paging techniques. For further information on paging systems, see e.g., *Wireless Basics*, 2nd Edition, 1996, Telephony Books, Overland Park, Kans., ISBN D-87288-633-6; and *Telocator Network Paging Protocol (TNPP)*—Version 3.6, Oct. 20, 1993, which are incorporated herein by reference. Such paging techniques are known for both alphanumeric and voice messaging. If the mobile station 120 was a mobile telephone and the wireless communication network 100 was a wireless cellular telephone network, then an alphanumeric message may be sent as a short message service (SMS) message, as described in IS-136.

Figure 3:
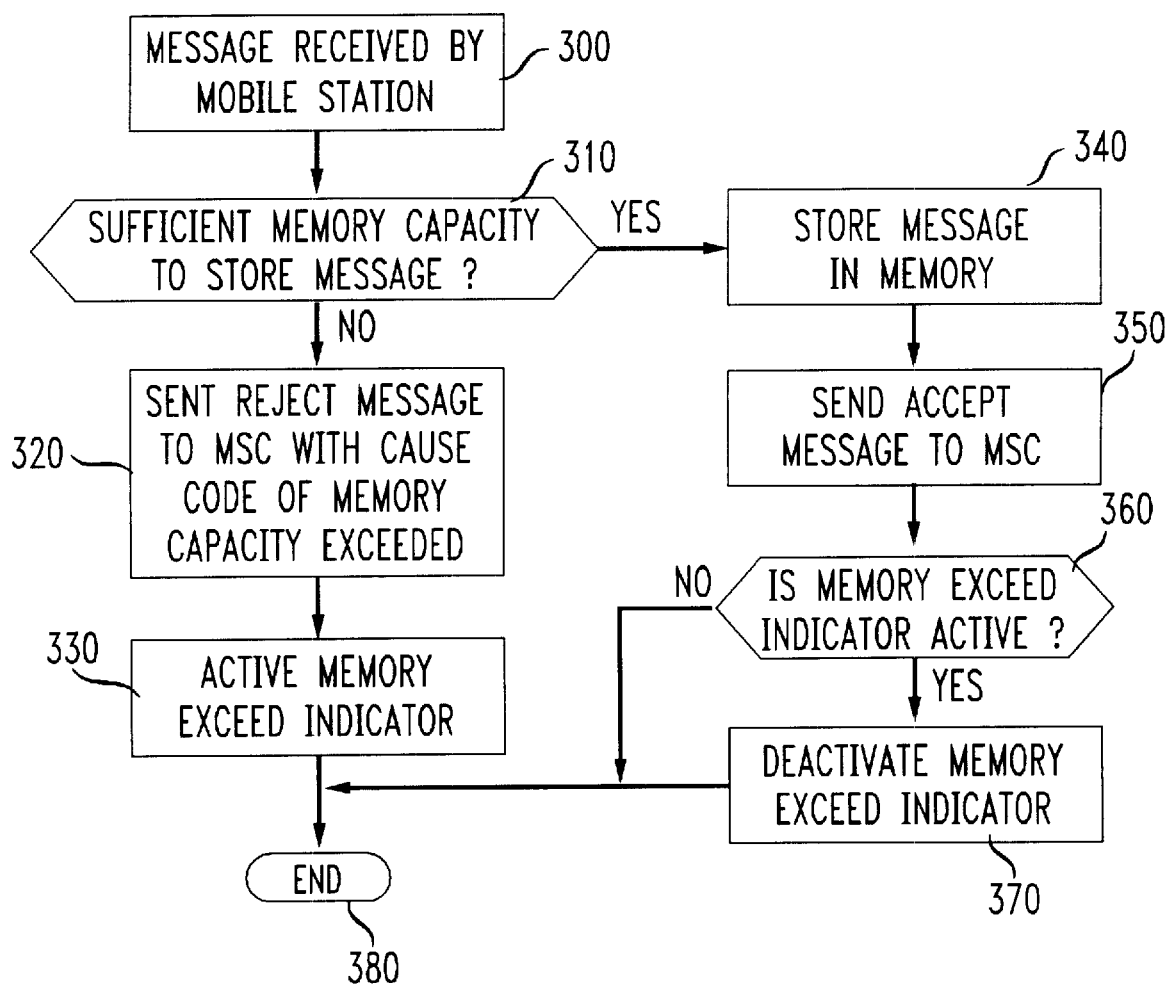
FIG. 3 if a flow diagram of the steps performed by the mobile station in accordance with the present invention.

The steps performed by the mobile station 120 in accordance with the present invention will now be described in conjunction with the flowchart of FIG. 3. As described above, these steps are performed under the control of the control processor 228 executing computer program instructions. In step 300 a message is received by the mobile station 120 from the wireless communication network 100. In step 310 the mobile station 120 determines if there is sufficient capacity in message memory 230 to store the message. If there is not sufficient capacity in message memory 230 to store the message, then in step 320 the mobile station 120 rejects the message and sends a reject message to the wireless communication system 100 indicating that the message rejection was caused by a lack of sufficient memory. In step 330 the memory exceed indicator 226 is activated (e.g. visual indicator illuminated or displayed, audio indicator sounded, tactile indicator stimulated) to indicate that a message was sent by the wireless communication system 100 but was unable to be received by the mobile station 120 due to insufficient memory. The processing ends in step 380.

As a result of such processing, the user of mobile station 120 is notified that there is a message waiting in the wireless communication network 100 which cannot be delivered until there is sufficient capacity in the message memory 230 of the mobile station 120. As a result, the user may delete one or more messages in the message memory 230 to make room for the new message.

As a result of the reject message being sent to the wireless communication system 100, the wireless communication system 100 knows that the message was rejected due to an insufficient memory condition. The wireless communication system may store the message in MC 108 and may attempt to re-send the message periodically.

Assume now that the user of mobile station 120 deletes one or more messages from the message memory 230 and there is now sufficient memory to receive the new message. Assume also that the MC 108 has waited for a period of time and now attempts to re-send the message. The mobile station 120 will begin processing the re-sent message at step 300 and will determine in step 310 that there is sufficient memory capacity in message memory 230 to receive the message. In step 340 the message will be stored in message memory 230. In step 350 an accept message will be sent to the wireless communication network 100 indicating that the message was successfully received. In step 360 it is determined whether the memory exceed indicator 226 is activated. If the memory exceed indicator 226 is activated, then in step 370 the memory exceed indicator 226 is deactivated. Following step 370, or if it was determined in step 360 that the memory exceed indicator 226 was not activated, then processing ends in step 380.

It is noted that the deactivation of the memory exceed indicator 226 may be handled in different ways. For example, the memory exceed indicator 226 may be deactivated each time the mobile station 120 is powered up. This technique may be useful where the wireless communication network 100 is of the type which will send any stored messages to the mobile station 120 each time the mobile station 120 is powered up and where messages are deleted from the wireless communication network if they have been undeliverable for a period of time. For example, suppose the mobile station 120 is in a state in which its message memory 230 is full and the memory exceed indicator 226 is activated. In this situation, there are messages stored in the message center 108 which are undeliverable. If the mobile station 120 is powered down and thereafter powered up again, the memory exceed indicator 226 will be deactivated upon power up, and the messages will be immediately sent to the mobile station 120. If the message memory 230 is still full, then the memory exceed indicator 226 will be activated. However, after a certain period of time, the undeliverable messages stored in the message center 108 will be deleted as being expired. Thereafter, if the mobile station 120 powers down and then powers up, the memory exceed indicator will be deactivated upon power up. Since there are no longer any messages in the message center 108 waiting to be delivered, the memory exceed indicator 226 will remain deactivated.

In an alternative technique, the memory exceed indicator 226 may be deactivated upon a user of mobile station 120 deleting some messages from the message memory 230 thereby making room to store additional messages. In such an embodiment, if the message center attempts to re-send a waiting message (either after some time period or upon power up of the mobile station 120), then the messages may be received by the mobile station 120 and stored in message memory 230. If all waiting messages are successfully retrieved, then the memory exceed indicator 226 will remain deactivated. Further, if the messages waiting in the message center 108 have been deleted from the message center 108 (because, for example, they have been waiting too long and have expired), then the memory exceed indicator 226 will remain deactivated because no new messages are waiting to be sent to the mobile station.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A wireless mobile telephone comprising:
   a transceiver for receiving calls and messages from said wireless telephone network;
   a memory for storing program instructions and messages received from said network;
   a microphone for communicating a user's voice to said network during one of said calls;
   a memory-exceed indicator which indicates that an incoming one of said messages is waiting in said network, but that said incoming message cannot be stored by said memory due to insufficient capacity in said memory, and which is deactivated upon application of power to said wireless mobile telephone; and
   a processor, coupled to said transceiver, said memory, said microphone and said memory-exceed indicator,
   said processor executing said program instructions to handle said calls and said messages received from said network and, in response to receiving an incoming one of said messages, said processor
      (a) determining whether sufficient capacity exists in said memory to store said incoming message;
      (b) if there is insufficient capacity in said memory, activating said memory-exceed indicator to indicate to a user that said memory contains insufficient capacity to store said incoming message, and performing a step selected from the group consisting of (i) deleting one or more messages stored in said memory and (ii) sending a reject message comprising a cause code to said network rejecting said incoming message, and
      (c) if there is sufficient capacity in said memory, storing said incoming message in said memory and deactivating said memory-exceed indicator.

2. The wireless mobile telephone of claim 1, wherein:
   said memory-exceed indicator is an audible indicator on said wireless mobile telephone.

3. The wireless mobile telephone of claim 1, wherein:
   said memory-exceed indicator is an audible indicator on said wireless mobile telephone.

4. The wireless mobile telephone of claim 1, wherein:
   said memory-exceed indicator is a tactile indicator on said wireless mobile telephone.

5. The wireless mobile telephone according to claim 1, wherein:
   said messages are text messages.

6. The wireless mobile telephone according to claim 5, wherein:
   text messages are short message service "SMS" messages.

7. The wireless mobile telephone of claim 1 wherein the cause code indicates memory capacity exceeded.

8. A method of operation of a wireless mobile telephone, said wireless mobile telephone including a memory storing program instructions and text and voice messages, a microphone, and a memory-exceed indicator, said method comprising the steps of:
   processing calls and text and voice messages received from a wireless telephone network;
   determining in response to receiving an incoming one of said messages whether sufficient capacity exists in said memory to store said incoming message,
   if there is insufficient capacity in said memory, activating said memory-exceed indicator to indicate to a user that said memory contains insufficient capacity to store said incoming message, and performing a step selected from the group consisting of (i) deleting one or more messages stored in said memory and (ii) sending a reject message comprising a cause code to said network rejecting said incoming message, and
   if there is sufficient capacity in said memory, storing said incoming message in said memory and deactivating said memory-exceed indicator; and
   deactivating said memory-exceed indicator upon application of power to said wireless mobile telephone.

9. The wireless mobile telephone of claim 8, wherein:
   said memory-exceed indicator is a visual indicator on said wireless mobile telephone.

10. The wireless mobile telephone of claim 8, wherein:
    said memory-exceed indicator is an audible indicator on said wireless mobile telephone.

11. The wireless mobile telephone of claim 8, wherein:
    said memory-exceed indicator is a tactile indicator on said wireless mobile telephone.

12. The method of claim 8 wherein the cause code indicates memory capacity exceeded.

13. A program memory comprising program instructions for performing a method comprising the following in a wireless mobile telephone:
    at the wireless mobile telephone, detecting an attempt to send one or more messages from a wireless telecommunication network to the wireless mobile telephone;
    responsive to detecting the attempt and based on detecting the attempt, determining that insufficient storage space is available at the wireless mobile telephone to store the messages; and
    responsive to determining that insufficient storage space is available to store the messages, executing program instructions to perform the following:
       (a) sending a reject message comprising a cause code from the wireless mobile telephone to the wireless communication system, wherein the reject message indicates the reject message was caused by a lack of sufficient memory; and
       (b) activating a memory exceed indicator at the wireless mobile telephone.

14. The program memory of claim 13 wherein the wireless mobile telephone communicates with the wireless telecommunication network according to the IS-136 standard.

15. The program memory of claim 13 wherein the attempt to send comprises an attempt to send a short message service message.

16. The program memory of claim 13 wherein the memory-exceed indicator comprises a special icon.

17. The program memory of claim 13 further comprising program instructions for performing a method comprising the following after activating the memory exceed indicator:
    periodically receiving one or more attempts to send the short message service messages from the wireless telecommunication network to the wireless mobile telephone;
    responsive to and based on the attempts, determining that sufficient storage space is available to store the short message service messages; and
    responsive to determining sufficient storage space is available, deactivating the memory exceed indicator.

18. The program memory of claim 13 further comprising program instructions for performing a method comprising the following after activating the memory exceed indicator:
    responsive to powering up the wireless mobile telephone, deactivating the memory exceed indicator.

19. The program memory of claim 13 further comprising program instructions for performing a method comprising the following after activating the memory exceed indicator:

responsive to deletion of stored messages in the wireless mobile telephone, deactivating the memory exceed indicator.

20. The program memory of claim 13 wherein the cause code indicates memory capacity exceeded.

21. The program memory of claim 13 wherein the method performed by the program instructions further comprises:

deactivating the memory exceed indicator upon deletion of messages from message memory of the wireless mobile telephone.

22. A wireless mobile telephone comprising a program memory comprising program instructions for performing the following:

sending a reject message comprising a cause code from the wireless mobile telephone to the wireless communication system responsive to determining that insufficient storage space is available;

activating a memory-exceed indicator to indicate at least one Short Message Service message is waiting at a wireless telephone network but cannot be stored at the wireless mobile telephone;

periodically receiving attempts to re-send the Short Message Service message by the wireless telephone network;

as a result of receiving one of the attempts, determining there is sufficient memory capacity to receive the Short Message Service message;

storing the Short Message Service message in the wireless mobile telephone;

sending an accept message to the wireless communication network indicating the Short Message Service message was successfully received; and as a result of determining there is sufficient memory capacity to receive the Short Message Service message, deactivating the memory-exceed indicator.

23. The wireless mobile telephone of claim 22 wherein the program instructions are operable to comply with the IS-136 standard relating to short message service.

24. The wireless mobile telephone of claim 22 wherein the memory-exceed indicator comprises a special icon.

25. The wireless mobile telephone of claim 22 wherein the cause code indicates memory capacity exceeded.

* * * * *

UNITED STATES PATENT AND TRADEMARK OFFICE
CERTIFICATE OF CORRECTION

PATENT NO.     : 6,628,935 B1
DATED          : September 30, 2003
INVENTOR(S)    : Christopher Gregory Lawrence It is certified that error appears in the above-identified patent and that said Letters Patent is hereby corrected as shown below:

Column 1,
Line 24, "Compatibility Digital" should read -- Compatibility-Digital --

Column 4,
Line 49, "to-the" should read -- to the --

Column 7,
Line 36, "an audible indicator on" should read -- a visual indicator of --

Signed and Sealed this

Thirtieth Day of March, 2004

JON W. DUDAS
*Acting Director of the United States Patent and Trademark Office*